(12) United States Patent
Cerecke et al.

(10) Patent No.: US 8,214,142 B2
(45) Date of Patent: Jul. 3, 2012

(54) SYSTEM AND METHOD FOR EFFICIENT ROUTING ON A NETWORK IN THE PRESENCE OF MULTIPLE-EDGE RESTRICTIONS AND OTHER CONSTRAINTS

(75) Inventors: Carl David James Cerecke, Christchurch (NZ); David John Mitchell, Christchurch (NZ); Ralph James Mason, Lincoln (NZ)

(73) Assignee: Telogis, Inc., Aliso Viejo, CA (US)

( * ) Notice: Subject to any disclaimer, the term of this patent is extended or adjusted under 35 U.S.C. 154(b) by 0 days.

(21) Appl. No.: 13/245,610

(22) Filed: Sep. 26, 2011

(65) Prior Publication Data

US 2012/0016582 A1    Jan. 19, 2012

Related U.S. Application Data

(63) Continuation of application No. 12/633,481, filed on Dec. 8, 2009.

(60) Provisional application No. 61/121,891, filed on Dec. 11, 2008.

(51) Int. Cl.
*G01C 21/00* (2006.01)

(52) U.S. Cl. ........ 701/408; 701/410; 701/117; 701/532; 340/425.5; 340/572.1; 340/995.19; 340/573.4; 340/5.2; 370/352; 370/351

(58) Field of Classification Search ................. 701/117, 701/410, 532; 370/352, 351; 340/425, 572.1, 340/995.19, 573.4
See application file for complete search history.

(56) References Cited

U.S. PATENT DOCUMENTS

| | | | | |
|---|---|---|---|---|
| 6,317,686 | B1* | 11/2001 | Ran | 701/533 |
| 2003/0031167 | A1* | 2/2003 | Singh et al. | 370/352 |
| 2003/0197612 | A1* | 10/2003 | Tanaka et al. | 340/572.1 |
| 2003/0223408 | A1 | 12/2003 | Chen et al. | |
| 2004/0088392 | A1* | 5/2004 | Barrett et al. | 709/223 |
| 2004/0104842 | A1 | 6/2004 | Drury et al. | |
| 2006/0097855 | A1* | 5/2006 | Turnbull et al. | 340/425.5 |
| 2006/0241854 | A1* | 10/2006 | Tu et al. | 701/202 |
| 2007/0027612 | A1* | 2/2007 | Barfoot et al. | 701/117 |
| 2007/0156326 | A1* | 7/2007 | Nesbitt | 701/200 |
| 2007/0162372 | A1* | 7/2007 | Anas | 705/35 |
| 2007/0208492 | A1* | 9/2007 | Downs et al. | 701/117 |

(Continued)

OTHER PUBLICATIONS

International Search Report and the Written Opinion of the International Searching Authority from International Application No. PCT/US2009/067164 dated Feb. 15, 2010.

(Continued)

*Primary Examiner* — Redhwan K Mawari
(74) *Attorney, Agent, or Firm* — Knobbe Martens Olson & Bear LLP

(57) ABSTRACT

Embodiments provide systems and methods that find the quickest route between two locations on a graph with multi-edge constraints in a time and space efficient manner. In some embodiments, Dijkstra's algorithm is split into separate universes when a) a multiple-edge constraint is reached, and b) along each edge of a multi-edge constraint. In some embodiments, the split is performed for the purpose of finding the quickest (i.e. lowest weighted) route to the intersection(s) at the end of the constraints. These universes, in some embodiments, are merged or discarded when the intersection at the end of the constraint is found. Using these systems and methods, in some embodiments, the shortest path between two locations of a multi-edge constrained road network can be efficiently determined.

16 Claims, 22 Drawing Sheets

U.S. PATENT DOCUMENTS

2007/0263590 A1* 11/2007 Abileah et al. ............... 370/351
2008/0183376 A1   7/2008 Knockeart et al.
2010/0036599 A1   2/2010 Froeberg et al.
2012/0016582 A1*  1/2012 Cerecke et al. ............... 701/410

OTHER PUBLICATIONS

International Search Report and Written Opinion, International Application No. PCT/US2011/56778, dated Mar. 28, 2012.

* cited by examiner

Priority Queue

| Intersection: A |
| Universe: First |
| Cost: 0 |
| No targets |
| No route |

Figure 2

SYSTEM AND METHOD FOR EFFICIENT ROUTING ON A NETWORK IN THE PRESENCE OF MULTIPLE-EDGE RESTRICTIONS AND OTHER CONSTRAINTS

CROSS-REFERENCE TO RELATED APPLICATIONS

This application is a continuation of U.S. patent application Ser. No. 12/633,481, titled SYSTEM AND METHOD FOR EFFICIENT ROUTING ON A NETWORK IN THE PRESENCE OF MULTIPLE-EDGE RESTRICTIONS AND OTHER CONSTRAINTS, filed Dec. 8, 2009, which claims the benefit under 35 U.S.C. 119(c) of U.S. Provisional Application No. 61/121,891, titled SYSTEM AND METHOD FOR EFFICIENT ROUTING ON A NETWORK IN THE PRESENCE OF MULTIPLE-EDGE RESTRICTIONS AND OTHER CONSTRAINTS, filed Dec. 11, 2008. Each of the foregoing applications is hereby incorporated by reference herein in its entirety.

BACKGROUND

1. Field

Embodiments generally relates to systems and methods for solving the shortest path problem and, more specifically in some embodiments, to a system and method for solving the shortest path problem on a graph with multi-edge constraints in a time and space efficient manner.

2. Description of Related Art

The shortest path problem is the problem of finding a path between two nodes of a graph that minimizes the sum of the weights of the path's edges. A real-world example of the shortest path problem is navigating a city's streets. A driver desires to get from one area of the city to another area of the city by driving the quickest route possible. The quickest route is determined by considering how far the driver must drive on each street in the city to get to the destination and how quickly the driver can drive on each of the streets, and then selecting the combination of streets in the city that minimize the amount of traveling time between the starting location and the destination. Depending on traffic, construction, road restrictions, etc., the quickest route can change considerably. In the above example, the city's network of streets is modeled as a graph. The nodes of the graph are the starting location and destination of the driver and all intersections in the street network. The streets the driver could travel on during the trip are the edges of the graph. Each edge is also assigned a weight representing the amount of time the driver must spend traveling the street that corresponds to the edge.

Several techniques have been developed to solve the shortest path problem, but all have considerable limitations. Dijkstra's algorithm can solve the shortest path problem, but only for a graph where the edge weights are independent of all previous edges. For example, continuing our driving example above, Dijkstra's algorithm cannot find the quickest route between two locations in a city where the city's network of streets has driving constraints based on which edge the driver has come from, such as no-left turns at certain intersections. The A* algorithm, which can also solve the shortest path program, is subject to the same limitations. Finally, while a simple breadth-first search with a priority queue can solve the shortest path problem, it is still subject to many of the same limitations. In particular, a breadth-first search will never allow a route where the same intersection must be visited twice. For example, if a left turn at an intersection is not allowed, the fastest route may be to go straight at the intersection, perform three right turns around a city block, and then go straight again at the same intersection.

SUMMARY

Embodiments overcome these and other deficiencies of the prior art by providing a system and method that finds the quickest route between two locations on a graph with multi-edge constraints in a time and space efficient manner. In some embodiments, Dijkstra's algorithm is split into separate universes when a) a multiple-edge constraint is reached, and b) along each edge of a multi-edge constraint. In some embodiments, the split is performed for the purpose of finding the quickest (i.e. lowest weighted) route to the intersection(s) at the end of the constraints. These universes, in some embodiments, are merged or discarded when the intersection at the end of the constraint is found. Using these systems and methods, in some embodiments, the shortest path between two locations of a multi-edge constrained road network can be efficiently determined.

In one embodiment, a method for determining an optimal route between a starting node and a destination node in a graph is provided. The graph includes a plurality of nodes and a plurality of edges, wherein each edge connects two nodes in the graph and has a cost. The method includes accessing, using a computer system, the graph; determining, using the computer system, at least one route between the starting node and the destination node, where each route has an ordered set of the edges, and where an edge of a route connects a universe of a first node with a universe of a second node; determining, using the computer system, a cost for each of the at least one routes; and selecting, using the computer system, the route from the at least one routes with the lowest cost.

In some embodiments, the cost for a route is based on the cost for utilizing each edge of the route, and the cost for an edge of a route is based on the cost for utilizing the edge between the universes of the nodes the edge connects. In another embodiment, the method further includes assigning at least one universe to each node connected to an edge of a route, where a first universe is assigned to the starting node, and where a universe other than the first universe is assigned to a node when the node is a start or continuation of a multi-edge constraint. In some embodiments, the method further includes generating a signal, using the computer system, to facilitate following the selected route to the destination node. In some embodiments, the signal is human perceivable. In some embodiments, the signal is transmitted to a second computer system over a network. In another embodiment, the second computer system generates a human perceivable signal based on the signal received over the network. In some embodiments, the edges represent streets, the nodes represent street intersections, the starting node represents a user's current location, and the destination node represents the user's desired destination. In some embodiments, the cost for a route is the amount of time needed to travel the route. In other embodiments, the cost for a route is the amount of money needed to travel the route. In yet another embodiment, the cost for a route is the total distance of the route. In some embodiments, the cost for a route is dynamic. In some embodiments, the cost for a route changes based on the time of day. In other embodiments, the cost for a route changes based on the type of vehicle used to travel the route.

In some embodiments, a computer readable medium having program instructions to determine an optimal route between a starting node and a destination node in a graph is provided. The graph has a plurality of nodes and a plurality of edges, where each edge connects two nodes in the graph and has a cost. The computer readable medium includes: program instructions for determining at least one route between the starting node and the destination node, each route having an ordered set of the edges, where an edge of a route connects a universe of a first node with a universe of a second node; program instructions for determining a cost for each of the at least one routes; and program instructions for selecting the route from the at least one routes with the lowest cost.

In some embodiments, the cost for a route is based on the cost for utilizing each edge of the route, where the cost for an edge of a route is based on the cost for utilizing the edge between the universes of the nodes the edge connects. In some embodiments, the computer readable medium further includes program instructions to assign at least one universe to each node connected to an edge of a route, where a first universe is assigned to the starting node, and where a universe other than the first universe is assigned to a node when the node is a start or continuation of a multi-edge constraint. In other embodiments, the computer readable medium further includes program instructions for causing a computer system to generate a signal to facilitate following the selected route to the destination node. In some embodiments, the signal is human perceivable. In some embodiments, the computer readable medium further includes program instructions for transmitting the signal to a second computer system over a network. In some embodiments, the second computer system generates a human perceivable signal based on the signal received over the network. In some embodiments, the edges represent streets, the nodes represent street intersections, the starting node represents a user's current location, and the destination node represents the user's desired destination. In some embodiments, the cost for a route is the amount of time needed to travel the route. In other embodiments, the cost for a route is the amount of money needed to travel the route. In another embodiment, the cost for a route is the total distance of the route. In some embodiments, the cost for a route changes based on the time of day. In some embodiments, the cost for a route changes based on the type of vehicle used to travel the route.

The foregoing, and other features and advantages of embodiments will be apparent from the following, more particular description of the preferred embodiments and the accompanying drawings.

BRIEF DESCRIPTION OF THE DRAWINGS

For a more complete understanding of embodiments, the objects and advantages thereof, reference is now made to the following descriptions taken in connection with the accompanying drawings in which:

FIG. 2 depicts the contents of a data structure upon insertion of the initial node into the data structure, according to an embodiment.

DETAILED DESCRIPTION OF EMBODIMENTS

Further features and advantages of embodiments, as well as the structure and operation of various embodiments, are described in detail below with reference to the accompanying FIGS. 1-22. The embodiments are described in the context of a road network, wherein letters indicate intersections, arrows indicate street direction, numerals indicate the cost of traversing the street, and dotted lines indicate streets with some restrictions placed on them. Nonetheless, one of ordinary skill in the art readily recognizes that embodiments are applicable in numerous fields and contexts which require efficient routing or travel between two nodes on a graph, such as data routing, package routing, video game play, etc.

Figure 1:
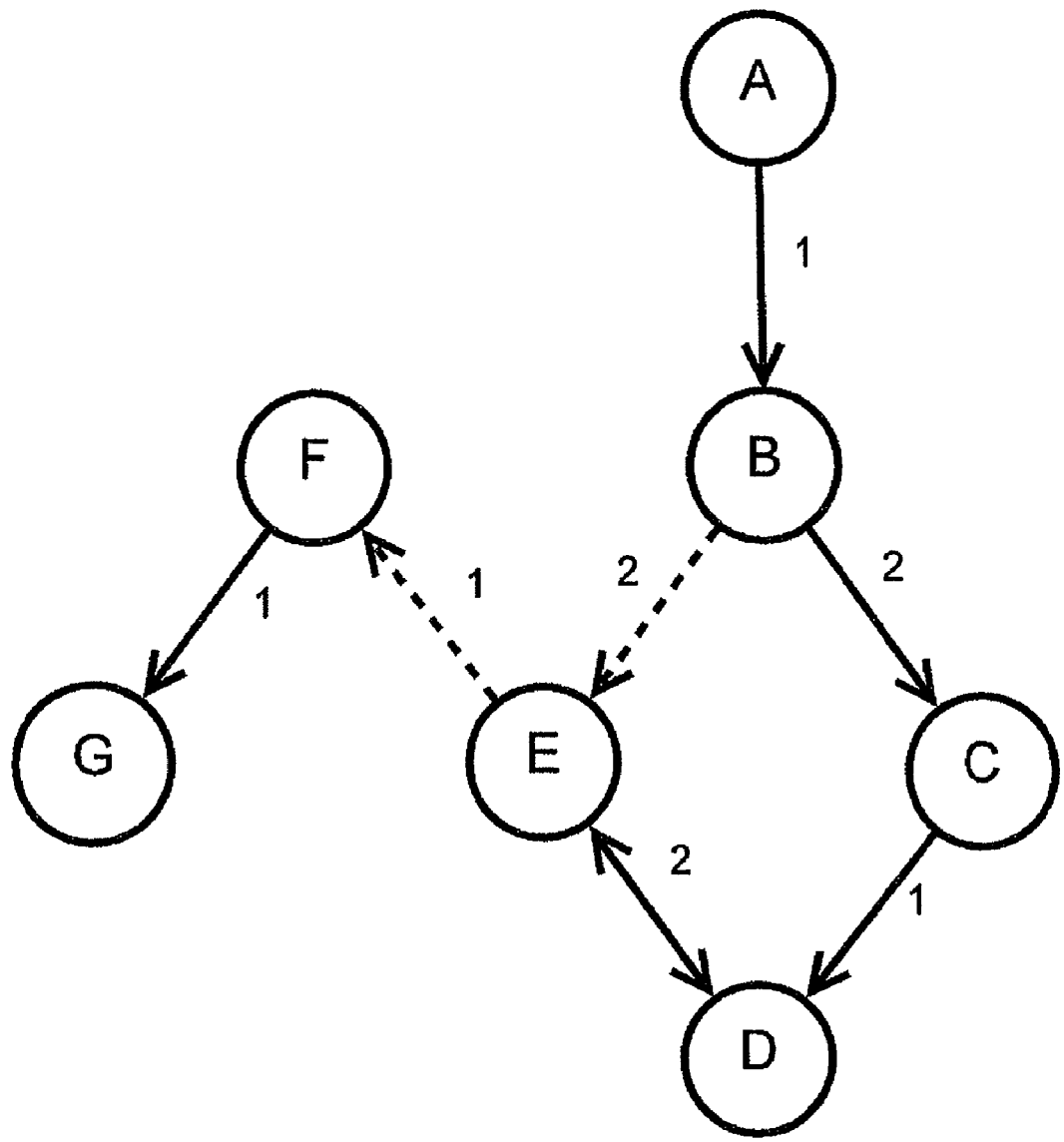
FIG. 1 depicts a simplified abstraction of a road network according to an embodiment.

Referring now to FIG. 1, depicted is a simplified abstraction of a road network according to an embodiment. Each street between intersections A, B, C, D, E, F, and G has a cost associated with it. These are the costs for utilizing the edges in the graph, and, in some embodiments, reflect a relationship between the nodes. For example, in some embodiments, the costs reflect the distance between intersections in a road network, or the time to travel between the intersections. The costs need not be reflective of time. For example, in some embodiments, costs reflect a monetary price for traveling between nodes, such as traveling via a toll road. In some embodiments, the costs for utilizing edges are dynamic. For instance, the costs for traveling between intersections in a road network may increase during rush hour, or may vary based on the type of vehicle being driven. Thus, for example, a specific street may be restricted to passenger cars only. In this example, a semi-truck would be prohibited from traveling on the street and the street's cost would, in some embodiments, be infinite. In some embodiments, edges may only be utilized in one direction. For example, the streets depicted in FIG. 1 have a direction of travel, indicated by the arrows. Thus, the street between intersection B and intersection E is one-way, and one could not travel from intersection E to intersection B directly. In some embodiments, an edge's directionality is dynamic. For instance, a street may be one-way into a city during morning rush hour, permit two-way travel into and out of the city during mid-day, and be one-way out of the city during evening rush hour. One of ordinary skill in the art will recognize that, in some embodiments, a two-way street is equivalent to two one-way streets, and thus numerous different options and constraints can be applied to simply one direction of travel on a two-way street.

The road network of FIG. 1 also comprises a multi-edge constraint B→E→F. That is, the street between intersections E and F cannot be traveled if the path through the road network would include B→E→F. As depicted, such multi-edge constraints may represent the prohibition of a right turn at intersection E. According to some embodiments, multi-edge constraints are modeled by dynamically increasing the cost of the edge E→F (to, potentially, infinite, if the real-life maneuver is impossible) if coming from intersection B. As discussed above, multi-edge constraints, in the context of a road network, typically represent no u-turns, or no-left/no-right turns. In contrast, single-edge constraints indicate a restriction that is independent of any other link, such as a height restriction. The lowest cost path from intersection A to intersection F is: A→B→C→D→E→F, with a total cost of 7. An alternative path, A→B→E→F, has an apparent total cost of 5, but contains the multi-edge constraint B→E→F and therefore is not allowed (that is, in some embodiments, it has an actual cost of infinity). According to an embodiment, the optimal path is determined by the following process.

In some embodiments, the first step for determining the optimal path is to specify the current location within the graph and the destination within the graph. For example, referring to FIG. 1, if a driver is currently located at intersection A, and desires to travel to intersection G, these two intersections must first be specified. In some embodiments, the current location is determined automatically using GPS or similar technology. In other embodiments, a user of the system manually inputs the current location. In some embodiments, the current and destination locations are included in a data structure for future reference, discussed in more detail below. In some embodiments, the current node, here intersection A, is then included in a first universe representing a possible path towards the destination node, here intersection G. Because the presence of a multi-edge constraint may require an intermediate intersection to be reached by a non-shortest path, in some embodiments, new universes are spawned at intersections along constraints to allow intersections to appear in multiple universes. For instance, the shortest distance from A to E is A→B→E, but the shortest distance to F is A→B→C→D→E→F. Multiple universes allow intersection E to exist in both, and not be discarded at A→B→C→D→E even though a shorter path (A→B→E) has already been found.

After including the current node in a universe, the current node, here intersection A, is inserted into a data structure for analysis. In some embodiments, a heap is used to implement a priority queue of nodes ordered by the least-cost appearance (i.e. the lowest cost universe) of each node. In other embodiments, data structures other than a heap are used. As one of ordinary skill in the art will recognize, in some embodiments, any type of data structure can be used so long as the following functions (or similar functions) are operable on the data structure:

Node* DeleteMin( )
If the minimum node has only one appearance (i.e. is in only one universe), then it is removed from the data structure.
If the minimum node has more than one appearance (i.e. is in more than one universe), then the minimum node is marked as not in the data structure.

Decrease(Node* value)
If either a) a new universe has been added that has a lower cost than an existing universe, or b) the cost of an existing universe has been reduced, then this function is used to preserve the data structure order.

Insert(Node* value)
If the node is not in the data structure then the node is inserted.

In addition, those of ordinary skill in the art will recognize that concepts aside from traditional data structures can be used to implement embodiments according to similar techniques, and that the use of a traditional data structure, and the specific methods for manipulating the data structures disclosed, are not necessary for implementing all embodiments and are, in some embodiments, for illustrative purposes only. Referring now to FIG. 2, depicted are the contents of the data structure upon insertion of the current node, intersection A, into the data structure, according to some embodiments. As is apparent, the data structure comprises intersection A, and intersection A appears in the first universe.

Figure 3:
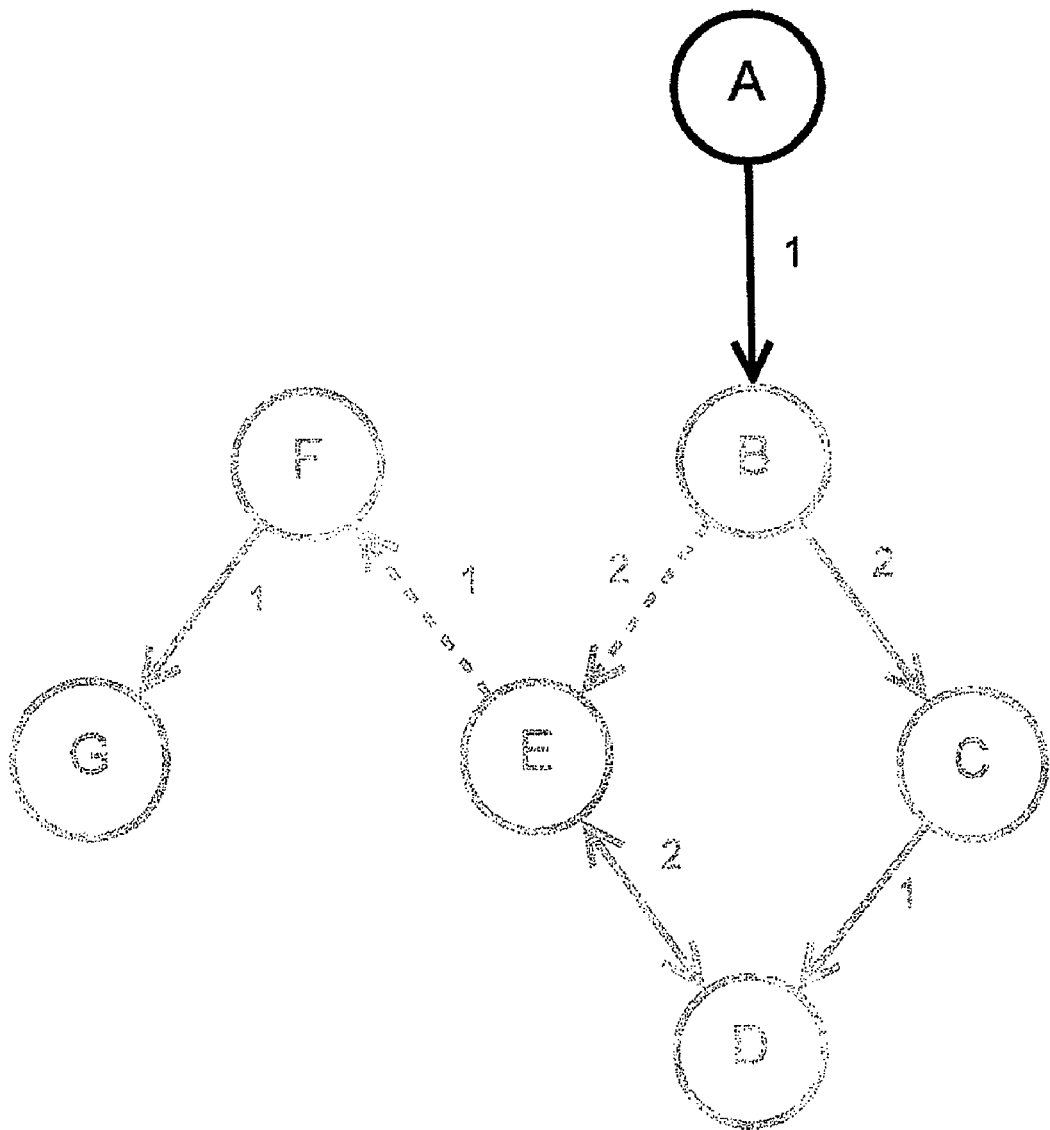
FIG. 3 illustrates a first iteration of an embodiment as applied to intersection A.

Next, in some embodiments, the node corresponding to the current location, which is the only node in the data structure and thus the node in the data structure with the lowest cost, is analyzed. For example, referring now to FIG. 3, illustrated is a first iteration of an embodiment as applied to intersection A. If a driver is located at intersection A, intersection A is removed from the priority queue portion of the data structure and operated on first. In some embodiments, the edges connected to the current node and their costs are determined. Thus, the street between A and B is identified and its cost, 1, is noted. If there are multiple single-edge constraints for traveling between nodes on a single edge then, in some embodiments, the highest applicable cost is used. For instance, if the typical travel cost between intersections A and B on a given street is 1, but only cars are permitted on the street, resulting in a high or infinite cost to buses, then if a car is driving on the street the cost will be 1, but if a bus is driving on the street the higher or infinite cost is used.

In some embodiments, the nodes connected to the current node via an edge appear in a universe. Thus, intersection B appears in a universe. In some embodiments, if a) the current universe of the node comprises a multi-edge constraint and the universe still has targets; or b) if any of the edges connected to the current node are the start of a multi-edge constraint and the connected node has not been seen in the universe of the current node, then each node connected to the current node appears in a new universe and each universe is assigned one or more targets. Otherwise, in some embodiments, all the nodes connected to the current node appear in the current universe of the current node. For example, in this case since the first universe of intersection A does not currently comprise a multi-edge constraint, and since the street between intersections A and B is not the start of a multi-edge constraint, intersection B also appears in the current universe of intersection A, the first universe. Targets, in some embodiments, correspond to the final node of the multi-edge constraint. In some embodiments, the targets or information related thereto is included in a data structure for future reference.

For each node the current node is directly connected to, in some embodiments, the total cost for traveling to the node for a given universe is determined. Still referring to FIG. 3, since there was no cost to travel to intersection A as a part of the first universe, and a cost of 1 to travel from intersection A to intersection B, the total cost to travel to intersection B in the first universe is 1.

In some embodiments, each node connected to the current node is given a route. A route indicates the node and universe from which each node came. For instance, intersection B appears in the first universe, and came from the intersection A which also appears in the first universe, therefore, the route of the intersection B in the first universe is the intersection A in the first universe. Those of ordinary skill in the art will recognize that a route is simply a means for identifying a specific path and its cost, and that numerous methods for determining the route of a path are possible.

Figure 4:
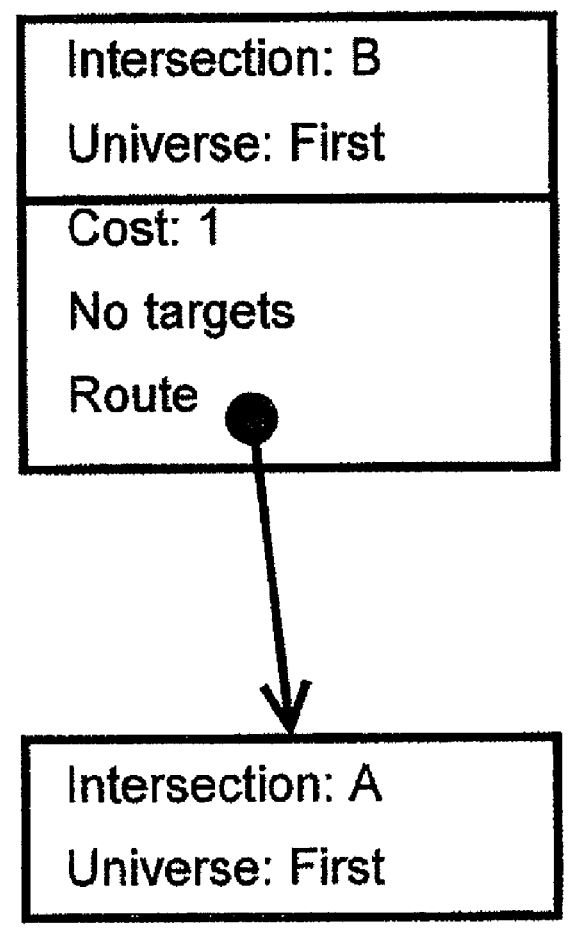
FIG. 4 depicts the contents of a data structure after the insertion of intersection B, according to an embodiment.

Finally, in some embodiments, each node connected to the current node is inserted into the priority queue data structure for future analysis. For example, intersection B is inserted into the priority queue data structure. Referring now to FIG. 4, depicted are the contents of the data structure and the operations performed on intersection A upon completion of the first iteration, according to an embodiment. As is apparent, intersection A is no longer a part of the priority queue data structure, while intersection B has been inserted into the priority queue data structure. Intersection B appears in the first universe, and the appearance is given a cost, and given a route to the part in the data structure representing the node from which it came, in this case intersection A in the first universe. Note that intersection A, while it no longer exists in the priority queue part of the data structure, does still exist in the data structure in order for routes from A to be able to be determined when necessary.

In some embodiments, the process discussed above with reference to FIG. 3 and FIG. 4 is generally repeated until the shortest path to the destination node is determined. Speaking generally, in some embodiments, the process proceeds by:

(a) selecting the node in the priority queue data structure with the lowest cost and marking the selected node as the current node;

(b) removing the current node from the priority queue data structure;

(c) determining the edges connected to the current node and their costs;

(d) determining whether the nodes connected to the current node should appear in the same universe is the current node, or whether a new universe should be created for each connected node to appear in;

(e) determining the total cost for traveling to each node connected to the current node for a given universe;

(f) specifying a route for each node connected to the current node; and (g) inserting each of the new nodes into to the priority queue data structure for future analysis.

Figure 5:
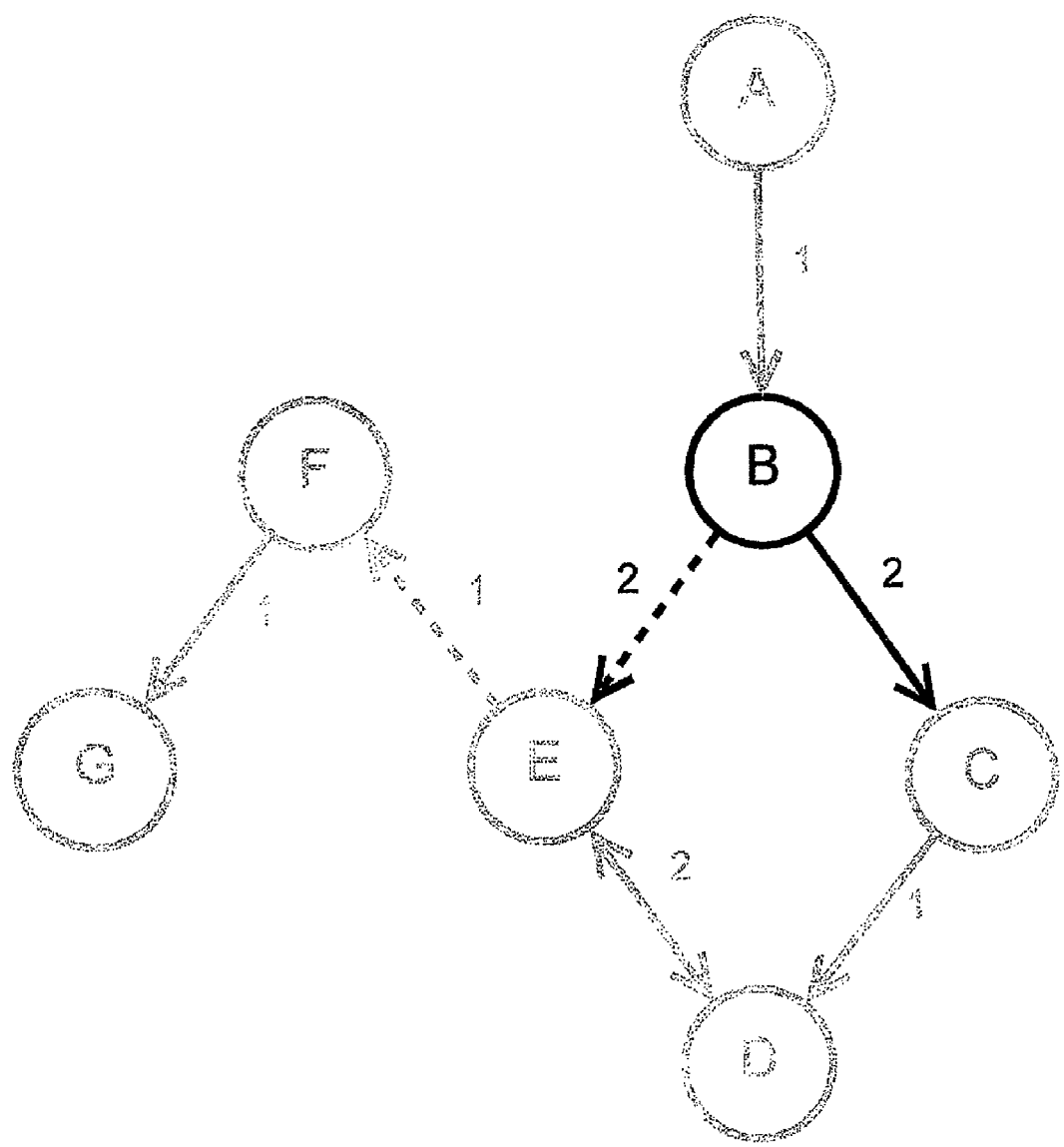
FIG. 5 illustrates an iteration of an embodiment as applied to intersection B.

Referring now to FIG. 5, illustrated is an iteration of an embodiment as applied to intersection B. Continuing from the prior example, since only intersection B is in the priority queue data structure, it is removed and operated on. The costs for traveling from intersection B to intersections C and E are determined, both of which are 2. In this case, since the street between intersections B and E is the start of a multi-edge constraint (B→E→F), new universes are created for each of intersections C and E to appear in. Intersection C is added to a second universe and intersection E is added to a third universe.

Figure 6:
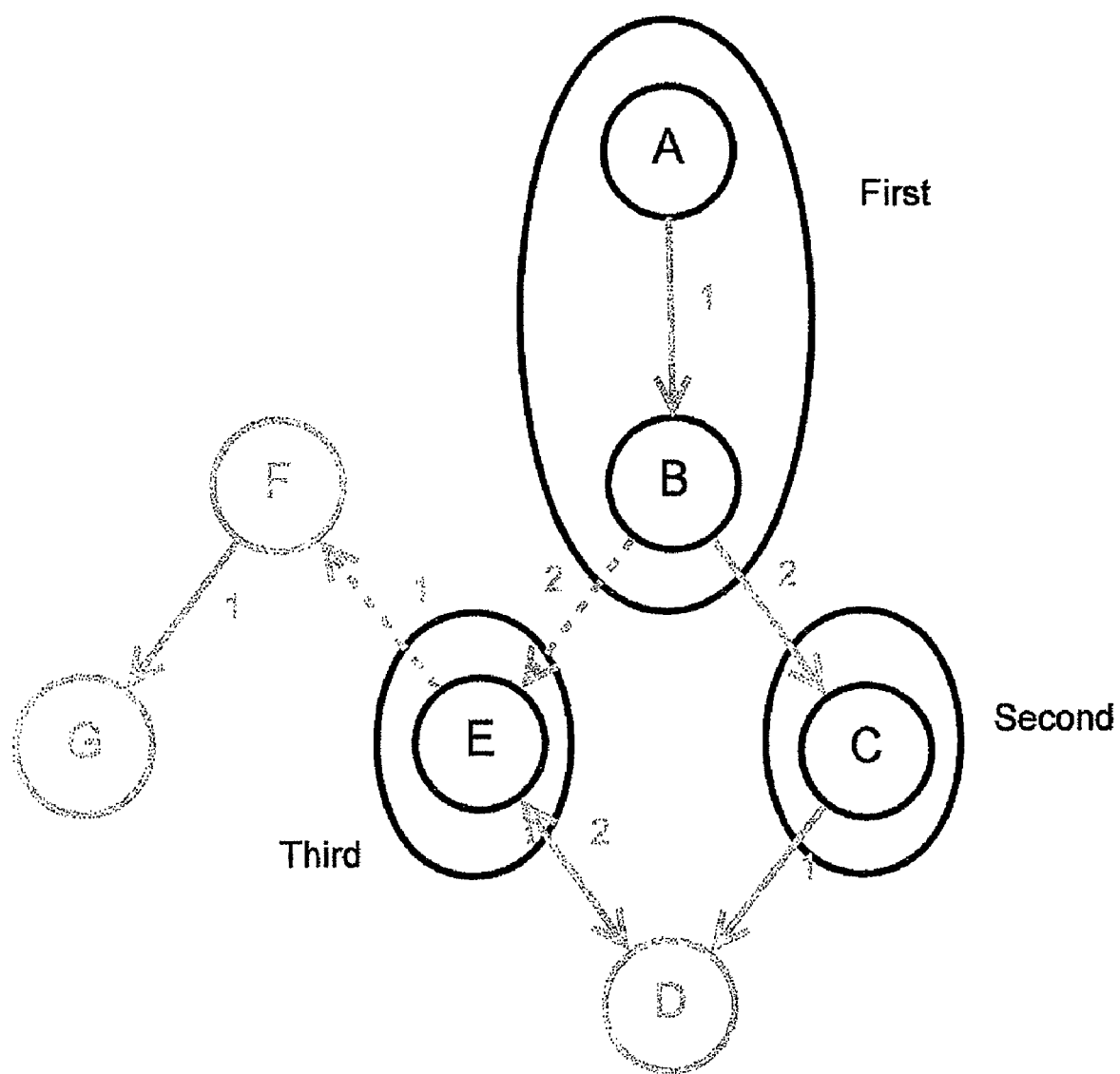
FIG. 6 illustrates which nodes of the road network appear in which universes after inserting intersections C and E, according to an embodiment.

Referring now to FIG. 6, illustrated are the universes of the road network after adding intersections C and E, according to an embodiment. The universes created for intersections C and E are also assigned a target corresponding to the final node of the multi-edge constraint. Thus, the universes of intersections C and E are assigned as a target intersection F.

Referring back to FIG. 5, the cost for intersections C and E is now determined, which is the sum of the cost to get to intersection B, which was 1, and the cost to get from intersection B to intersections C and E, respectively. Thus, the cost for intersection C is 3, and the cost to get to intersection E is also 3. The appearances of intersections C and E are then given routes, here the appearance of B in the first universe. Finally, the appearances of intersections C and E are inserted into the data structure for future analysis.

Figure 7:
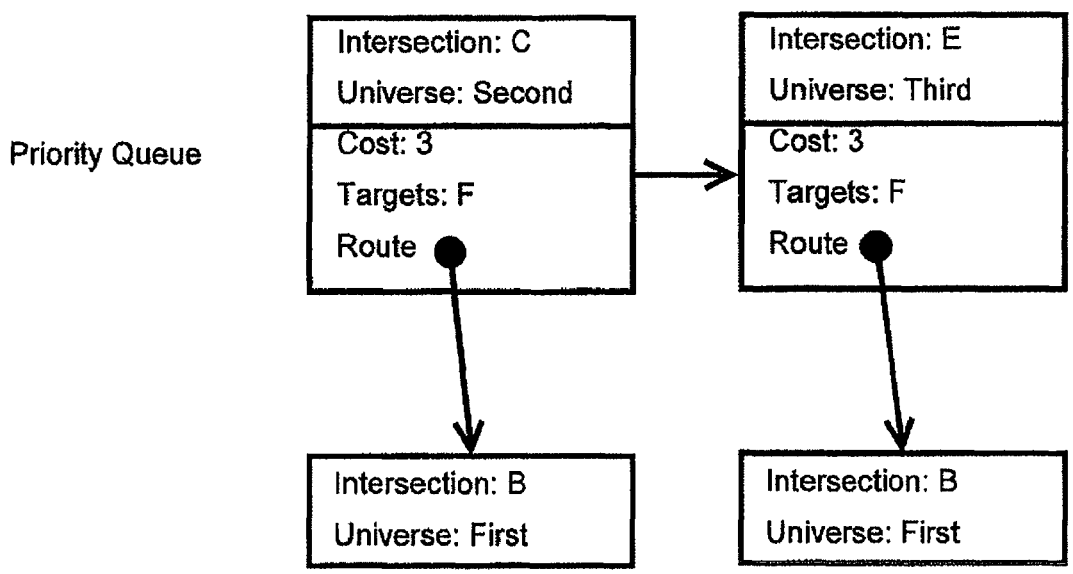
FIG. 7 depicts contents of a data structure following the iteration in FIG. 5, according to an embodiment.

Referring now to FIG. 7, depicted are the contents of the data structure upon completion of an additional iteration, according to an embodiment. Intersection B is no longer a part of the priority queue data structure, while appearances of intersections C and E have been inserted into the data structure. Intersections C and E have each appeared in a separate universe, and those appearances have been given a cost and a route. As the priority queue is, in some embodiments, ordered by cost, and the appearances of C and E both have a cost of 3, the order of C and B in the priority queue is arbitrary. In this example, C is before E in the priority queue, but this ordering is not required; it could equally be E before C.

Figure 8:
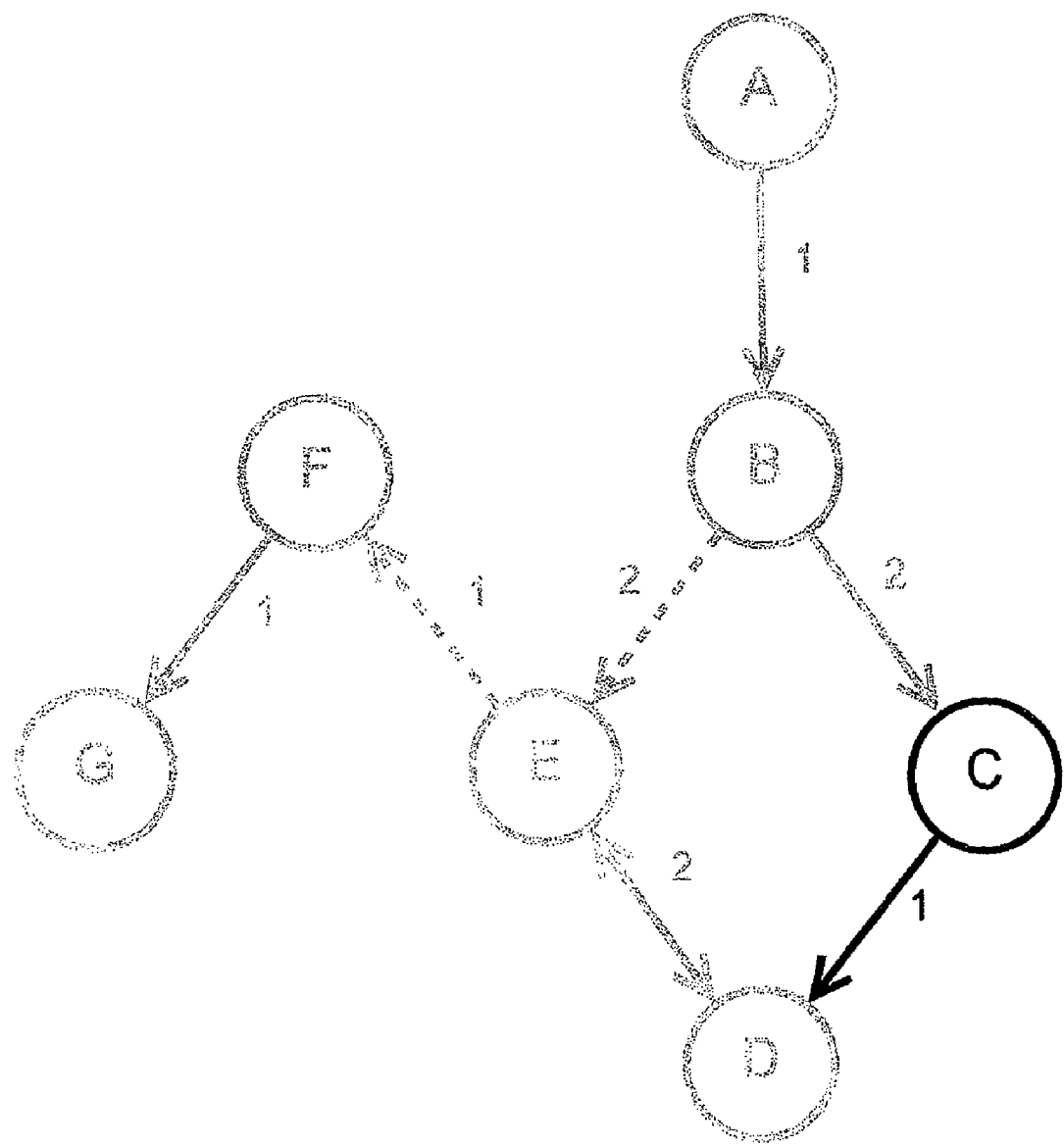
FIG. 8 illustrates an iteration of an embodiment as applied to intersection C.
Figure 9:
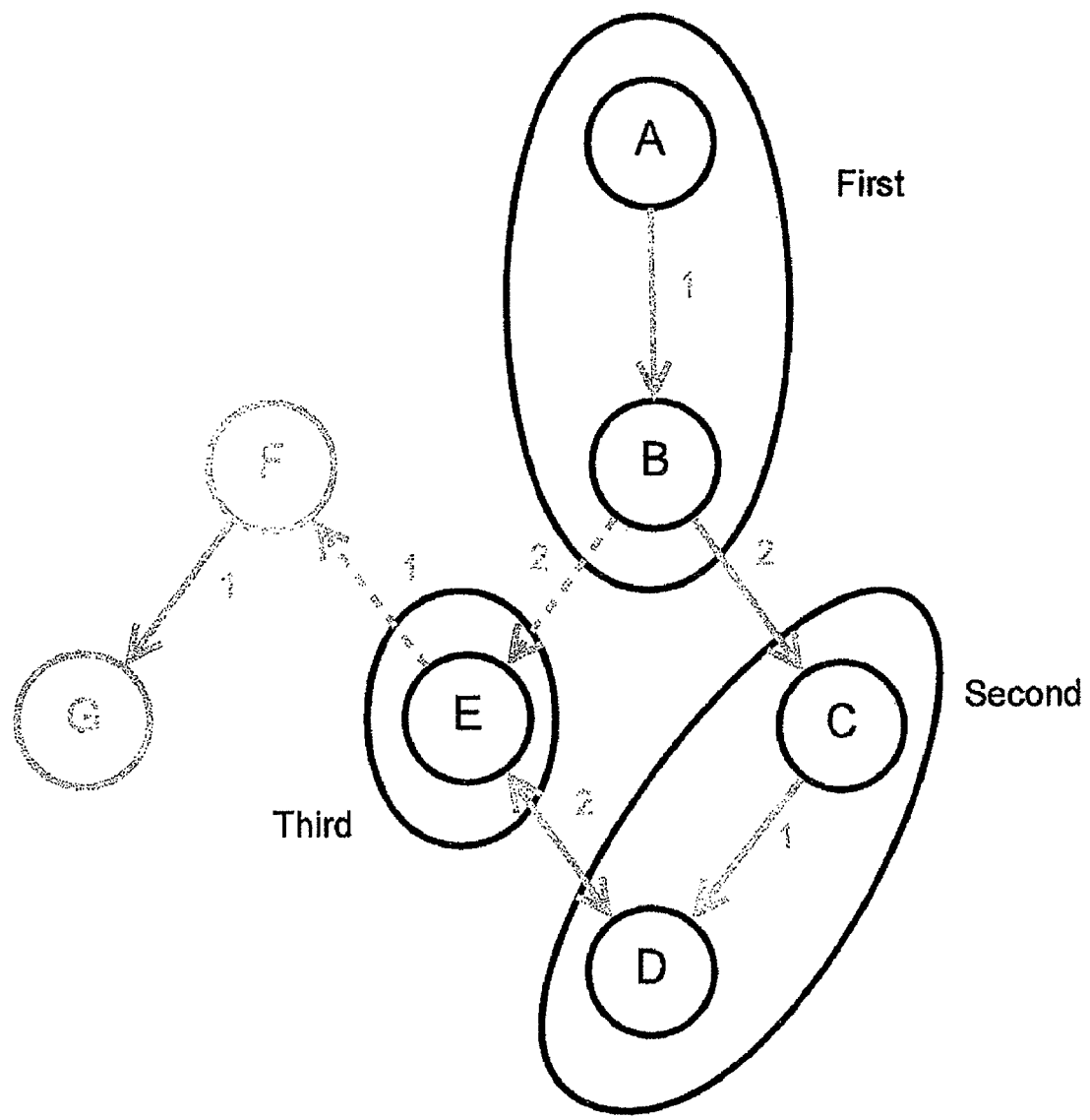
FIG. 9 depicts the universes of the road network after inserting intersection D into the second universe, according to an embodiment.

Referring now to FIG. 8, illustrated is an iteration of an embodiment as applied to intersection C, as the appearance of intersection C is at the front of the priority queue. The cost for traveling from intersection C to intersection D is determined, which is 1. Intersection D appears in the same universe (the second universe) as intersection C, because C is not on a multi-edge constraint. Referring now to FIG. 9, depicted are the universes of the road network after the appearance of intersection D in the second universe, according to an embodiment. The appearance of intersection D is then given a route to the appearance of intersection C in the same universe. The cost for the second universe of intersection D is determined, 4 (equivalent to the cost of traveling from A→B→C→D). Finally, intersection D is inserted into the data structure for future analysis.

Figure 10:
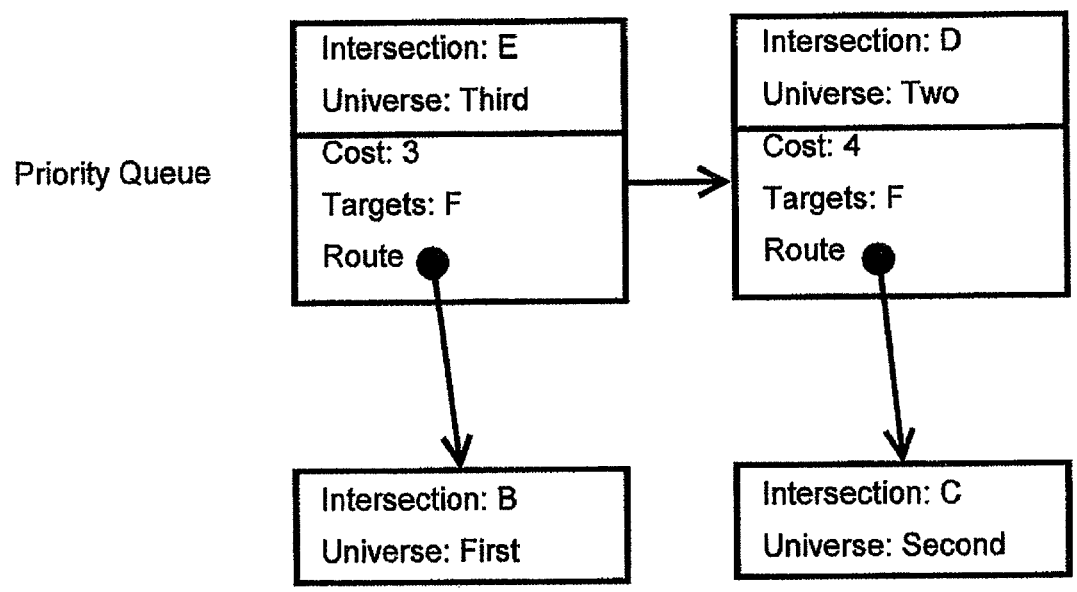
FIG. 10 depicts the contents of a data structure following FIG. 8, according to an embodiment.

Referring now to FIG. 10, depicted are the contents of the data structure, according to an embodiment. The appearance of Intersection C is no longer a part of the data structure, while the appearance of intersection D has been inserted into the data structure. In some embodiments, since the cost of intersection D is higher than the cost of intersection E, intersection E is at the front of the priority queue data structure to be operated on next.

Figure 11:
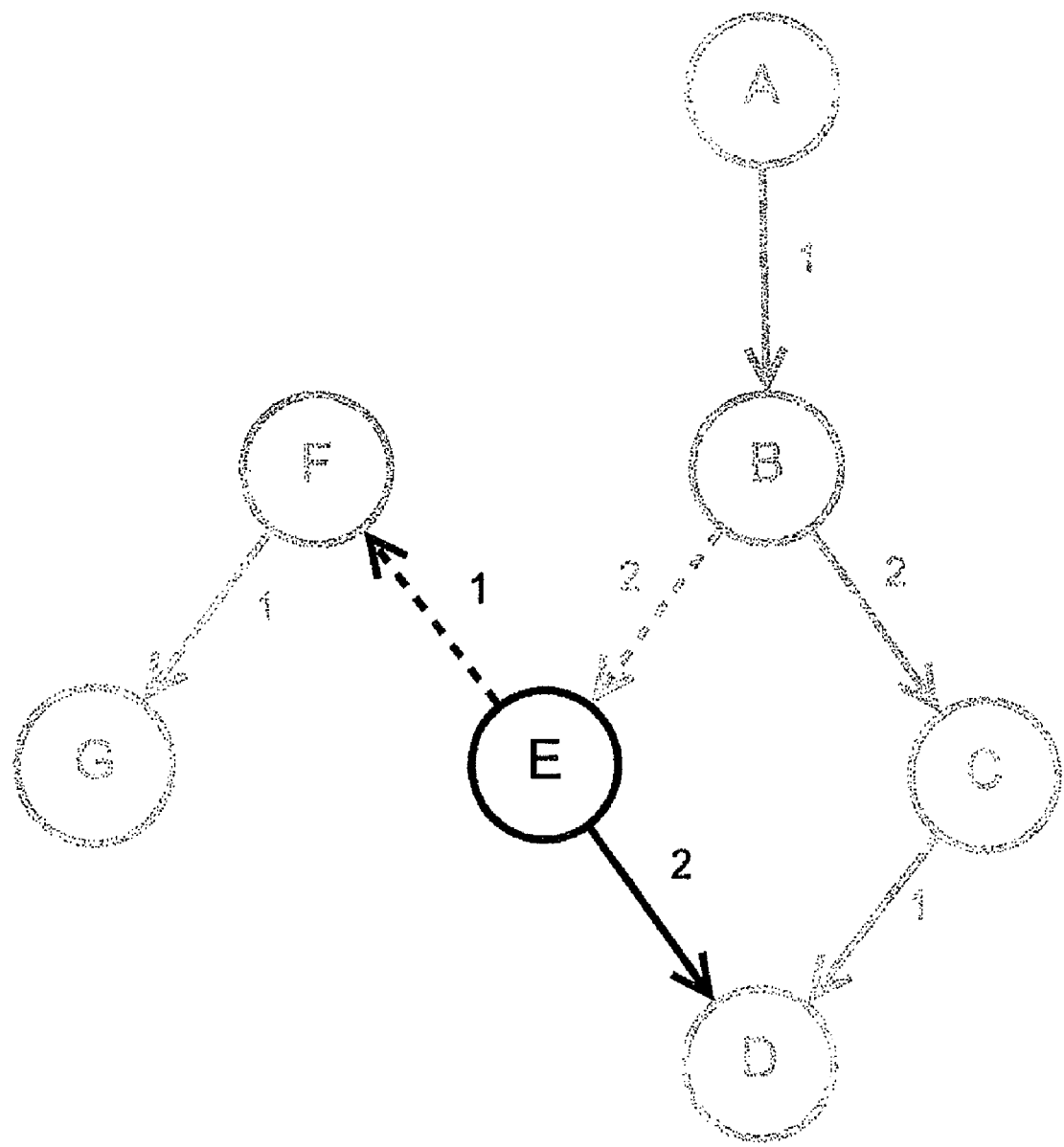
FIG. 11 illustrates an iteration of an embodiment as applied to the appearance of E in the third universe.

Referring now to FIG. 11, illustrated is an iteration of an embodiment as applied to the appearance of intersection E in third universe. Since the appearance of intersection E has a cost of 3, while the appearance of intersection D has a cost of 4, the appearance of intersection E is selected to be removed from the priority queue data structure and operated on. The cost for traveling from intersection E to intersections D and F is determined. The cost for traveling from intersection E to intersection D, 1, is easily found, but the cost between intersections E and F in this case is not as straightforward. As discussed above, the street to intersection F from intersection E, when part of the path B→E→F, is constrained. Such constraint, for example, represents a "no right turn" at intersection E. In some embodiments, the cost of travel between intersections E and F in the third universe is therefore infinite, meaning the path will never be the shortest path and will not be taken. Nevertheless, in some embodiments, the appearance of F will be added to the priority queue data structure.

Figure 12:
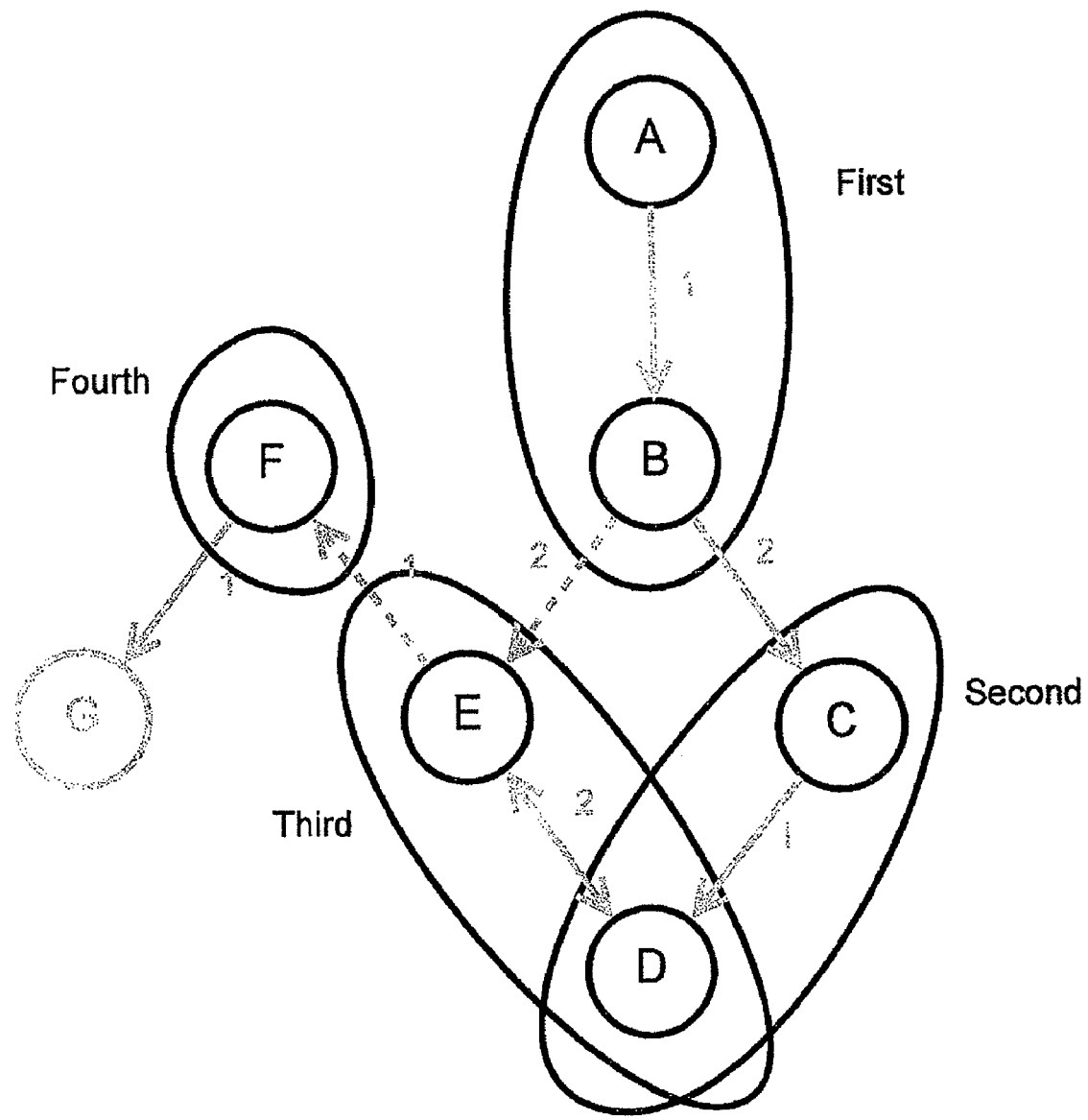
FIG. 12 depicts the universes after the iteration in FIG. 11, according to an embodiment.

Referring now to FIG. 12, intersection F appears in a new universe, universe four, because F is on a multi-edge constraint.

Figure 13:
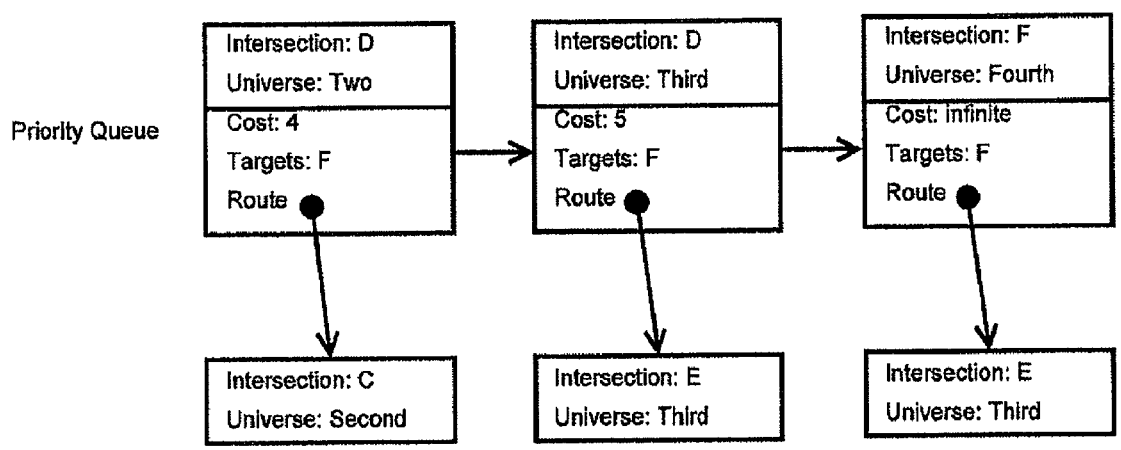
FIG. 13 depicts the contents of a data structure after FIG. 11, according to an embodiment.

Referring now to FIG. 13, the priority queue data structure has intersection D appearing twice. The first appearance of D is in universe two, with a cost of 4, and a route coming from Intersection C which also appears in universe two. This corresponds to the path A→B→C→D. The second appearance of D is in universe three, with a cost of 5, and a route coming from Intersection E which also appears in universe three. This corresponds to the path A→B→E→D.

Figure 14:
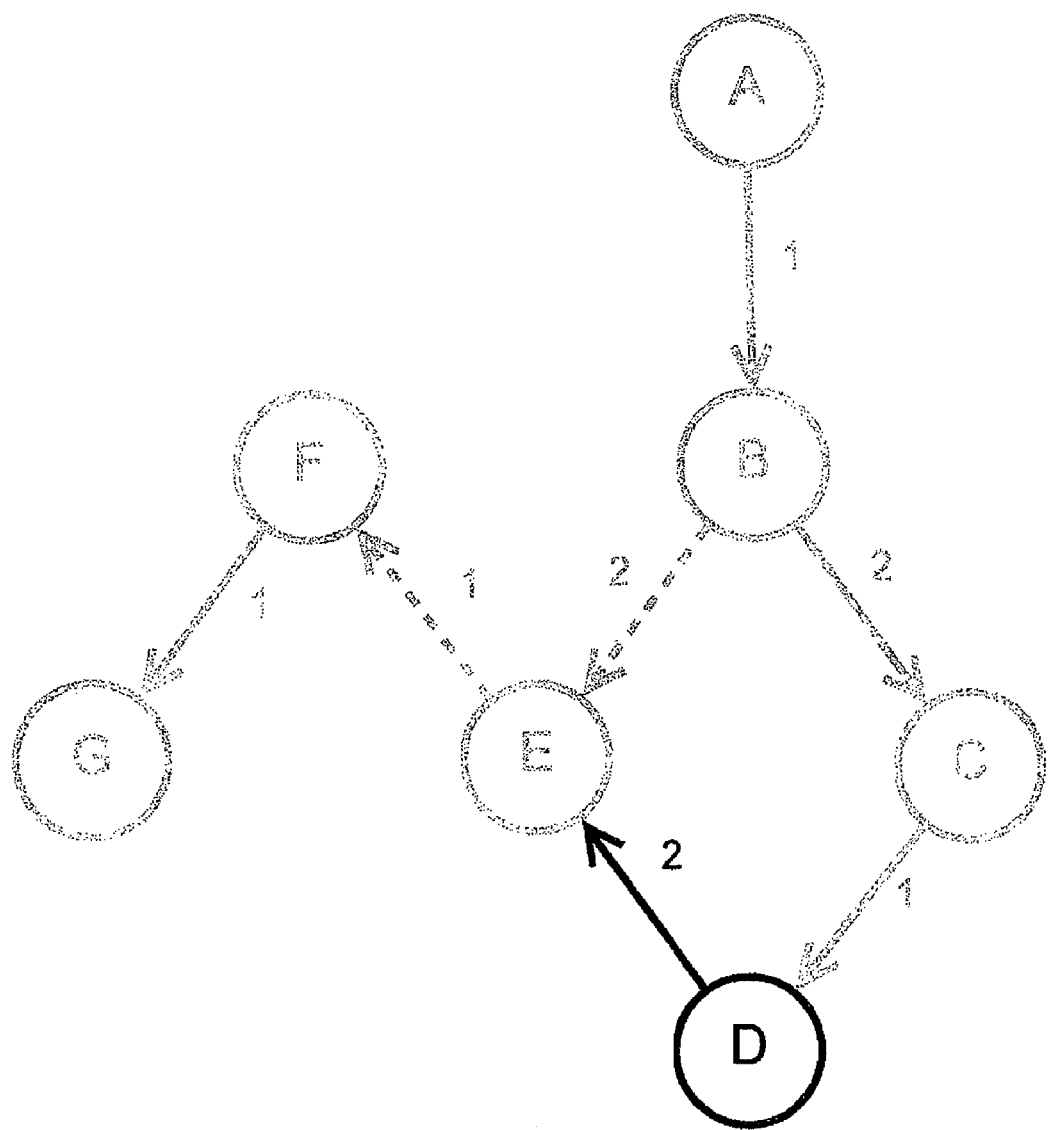
FIG. 14 illustrates an iteration of an embodiment as applied to the appearance of D in the second universe, according to an embodiment.

Referring now to FIG. 14, illustrated is an iteration of an embodiment as applied to the appearance of intersection D in the second universe. As in previous iterations, the other appearances, that is, the appearance of D (in the third universe) and the appearance of F (in the fourth universe), remain in the priority queue data structure. An appearance of E is created in the second universe with a cost of 6 and a route pointing to the appearance of intersection D in the second universe.

Figure 15:
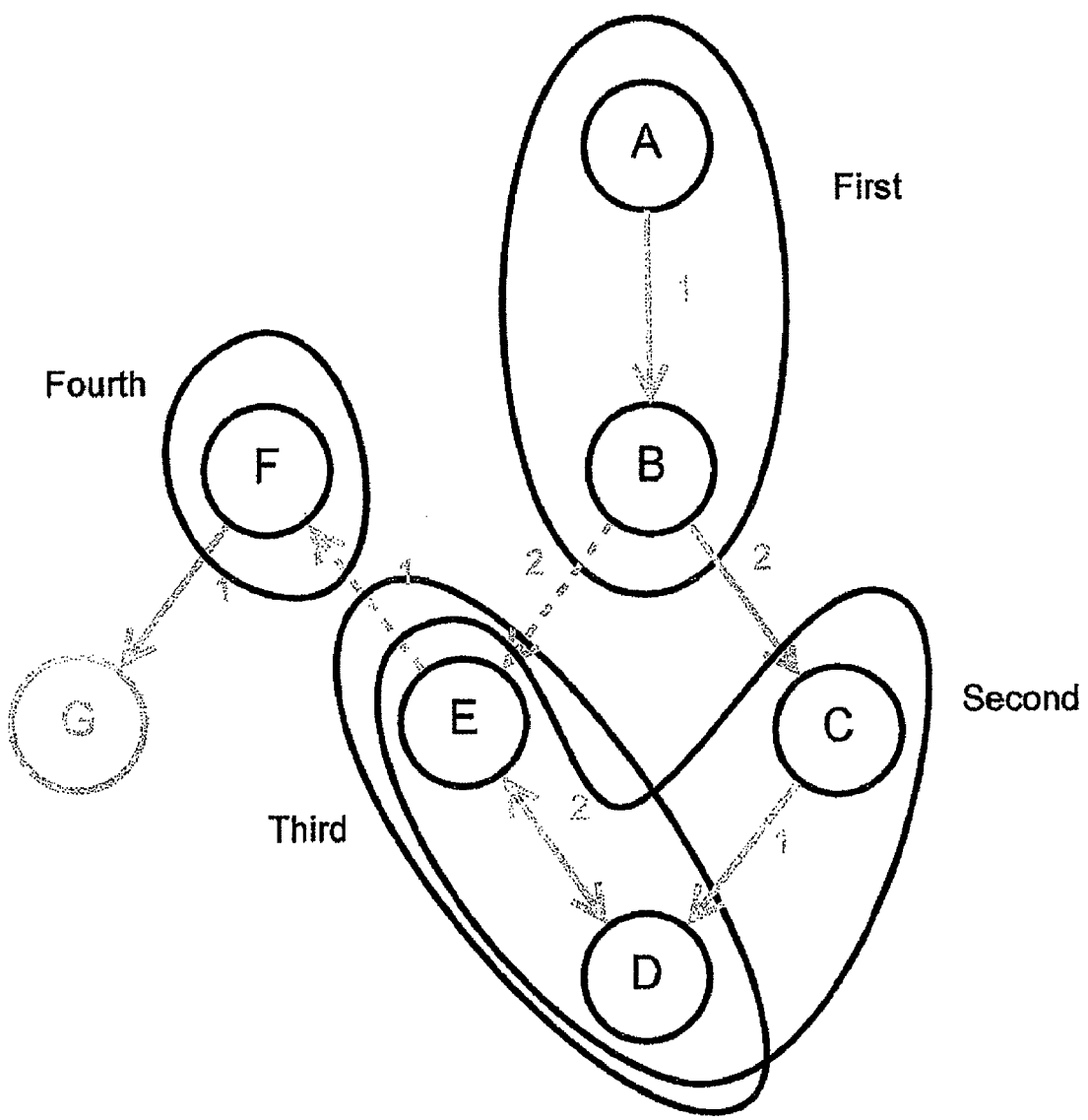
FIG. 15 depicts the universes after the iteration in FIG. 13, according to an embodiment.

Referring now to FIG. 15, intersections D and E appear in both the second and third universes, while the other intersections appear in only one universe (or no universes in the case of intersection G).

Figure 16:
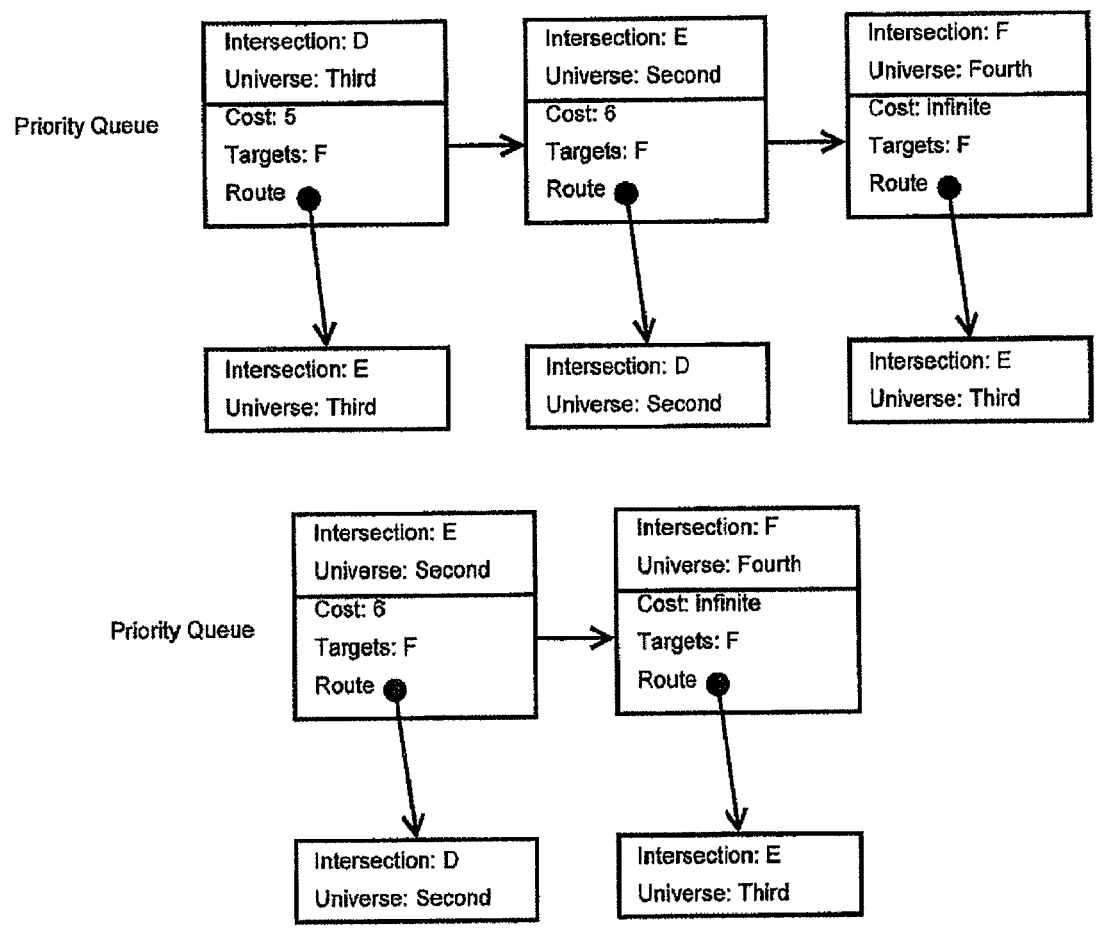
FIG. 16 depicts the contents of a data structure after FIG. 14 in the first part, and in the second part, as it appears following the discarding of the edge from D→E as a result of the edge being not on a constraint and having been seen before, according to an embodiment.

Referring now to FIG. 16, the upper priority queue data structure shows the configuration following the operation in FIG. 14. The next operation, not shown in any figure, is an attempt from the appearance of D in universe three to follow the edge back from whence it came to intersection E. This attempt fails, because the edge D E has already been followed in FIG. 14 and the edge is not on a multi-edge constraint. Failed attempts of this nature occur regardless of the whether the edge was seen in the same universe or not. The lower priority queue data structure shows the configuration following the failed attempt.

Figure 17:
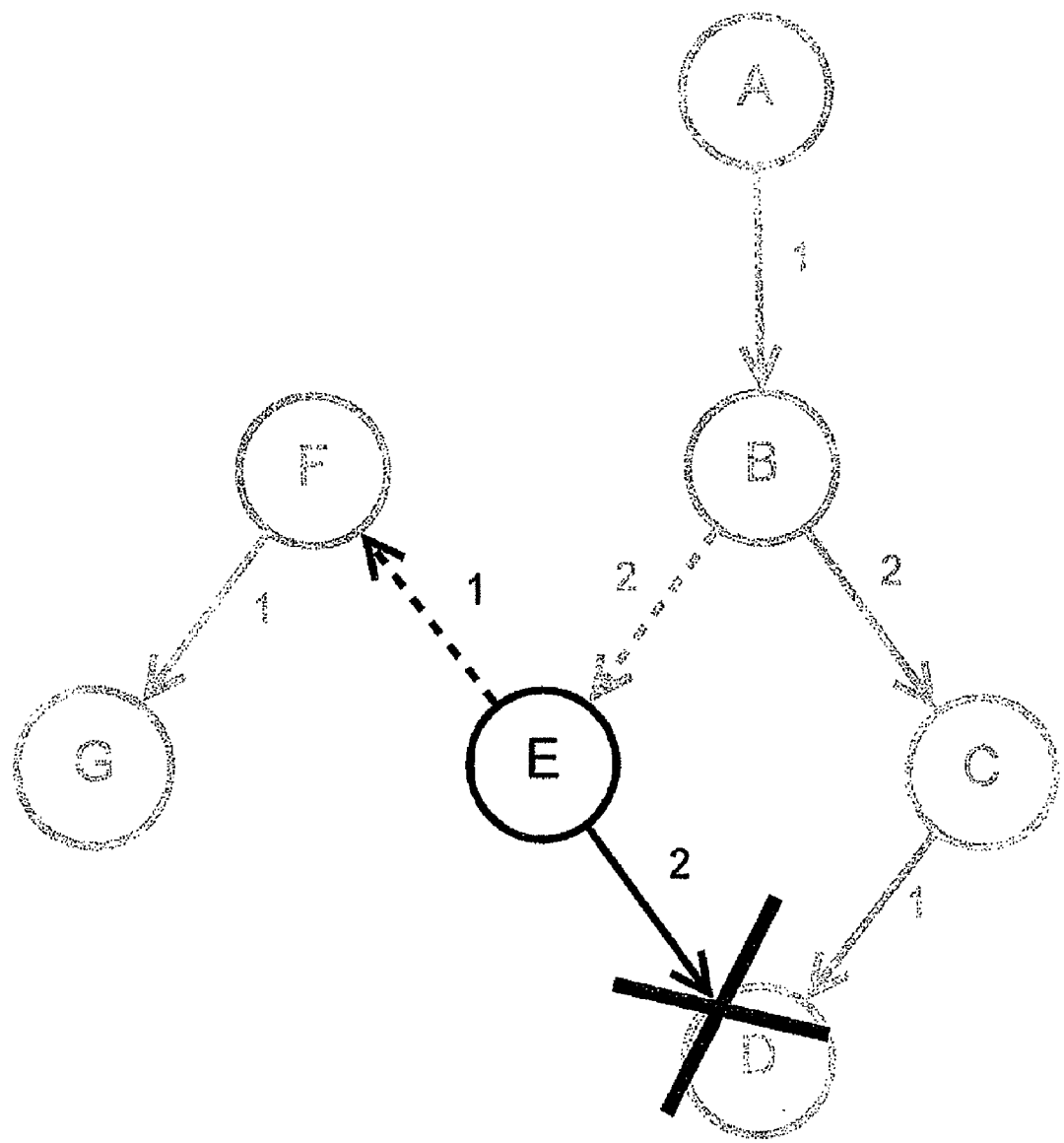
FIG. 17 illustrates an iteration of an embodiment as applied to the appearance of E in the second universe, according to an embodiment.

Referring now to FIG. 17, illustrated is an iteration of an embodiment as applied to the appearance of intersection E in the second universe. The edge E→D fails due to the fact that the edge E→D has already been followed from an appearance of E in another universe (universe three in FIG. 11), along with the fact that E→D is not on a multi-edge constraint. Intersection F appears in a new universe, universe five with a cost of 7, and the route pointing to the appearance of intersection E in universe three.

Figure 18:
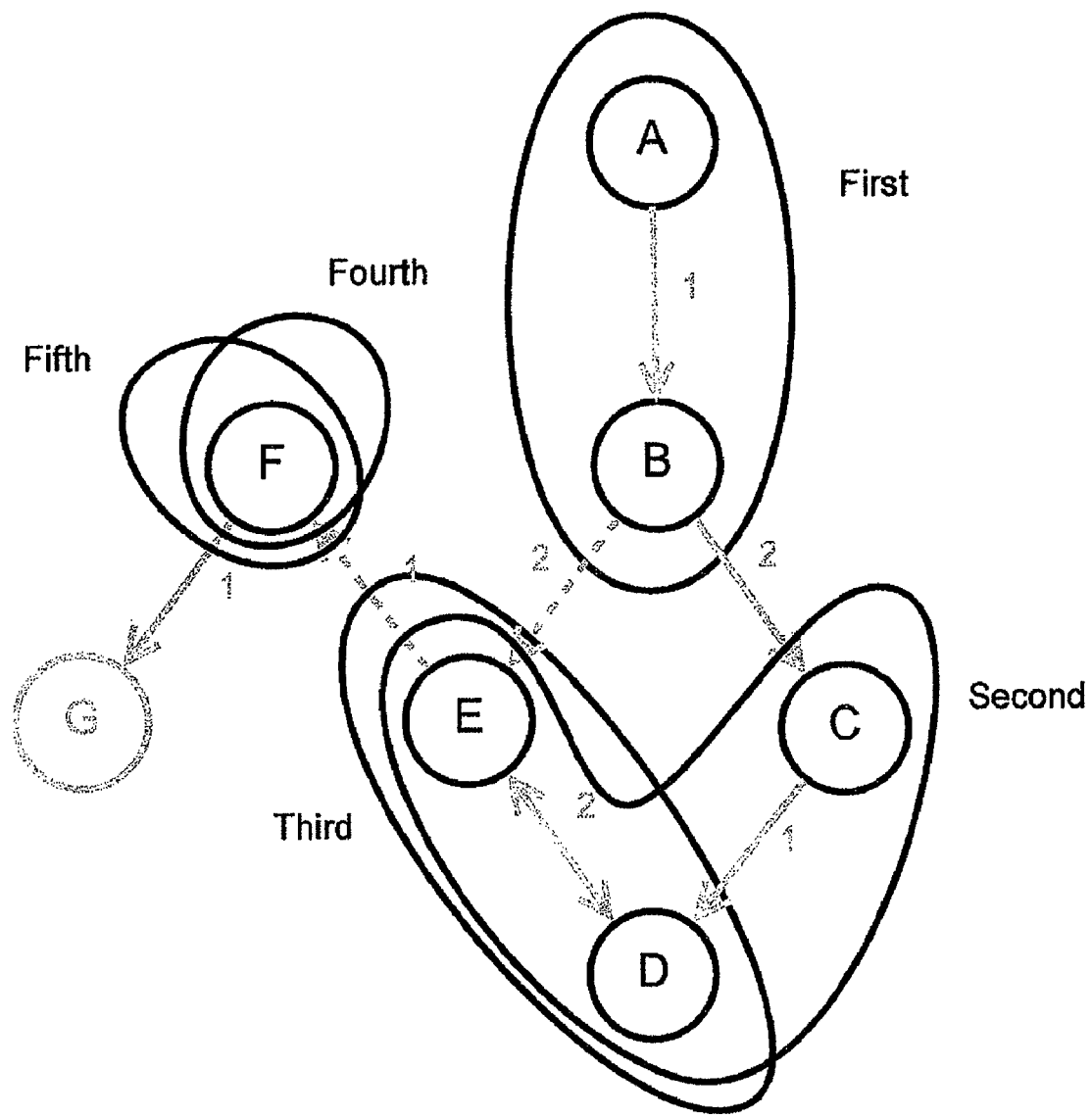
FIG. 18 depicts the universes after the iteration in FIG. 17.

Referring now to FIG. 18, the appearance of F in two universes, four and five, can be seen, according to one embodiment.

Figure 19:
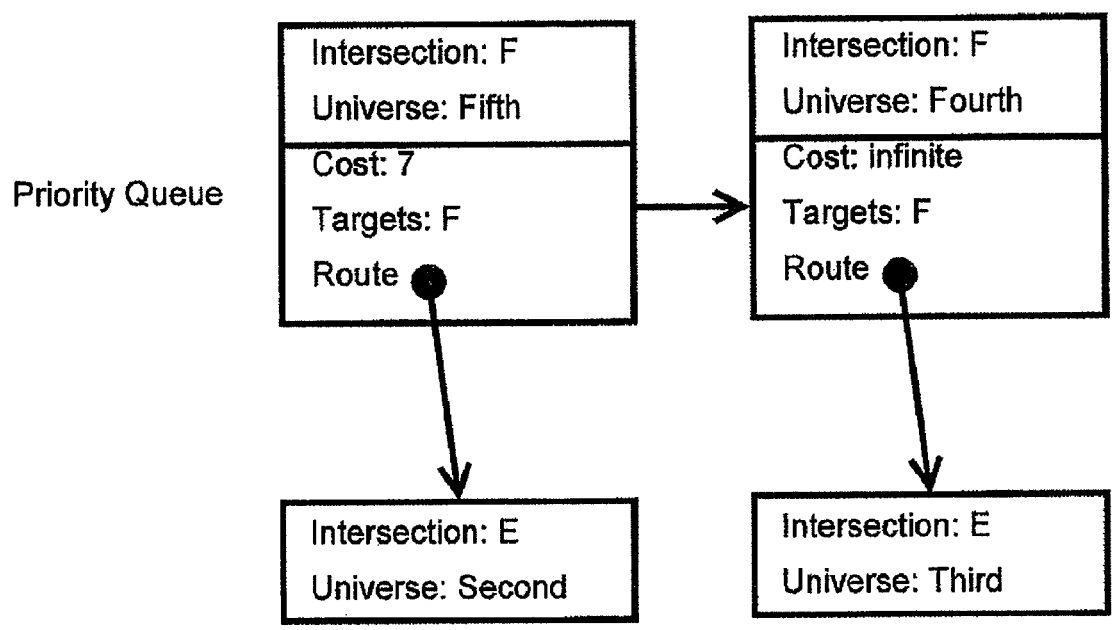
FIG. 19 depicts the contents of a data structure after the iteration in FIG. 17, according to an embodiment.

Referring now to FIG. 19, the priority queue data structure contains intersection F appearing twice, once in universe five with a cost of 7 and a route pointing to intersection E as it appears in universe two, and once in universe four with an infinite cost and a route pointing to intersection E as it appears in universe three.

Figure 20:
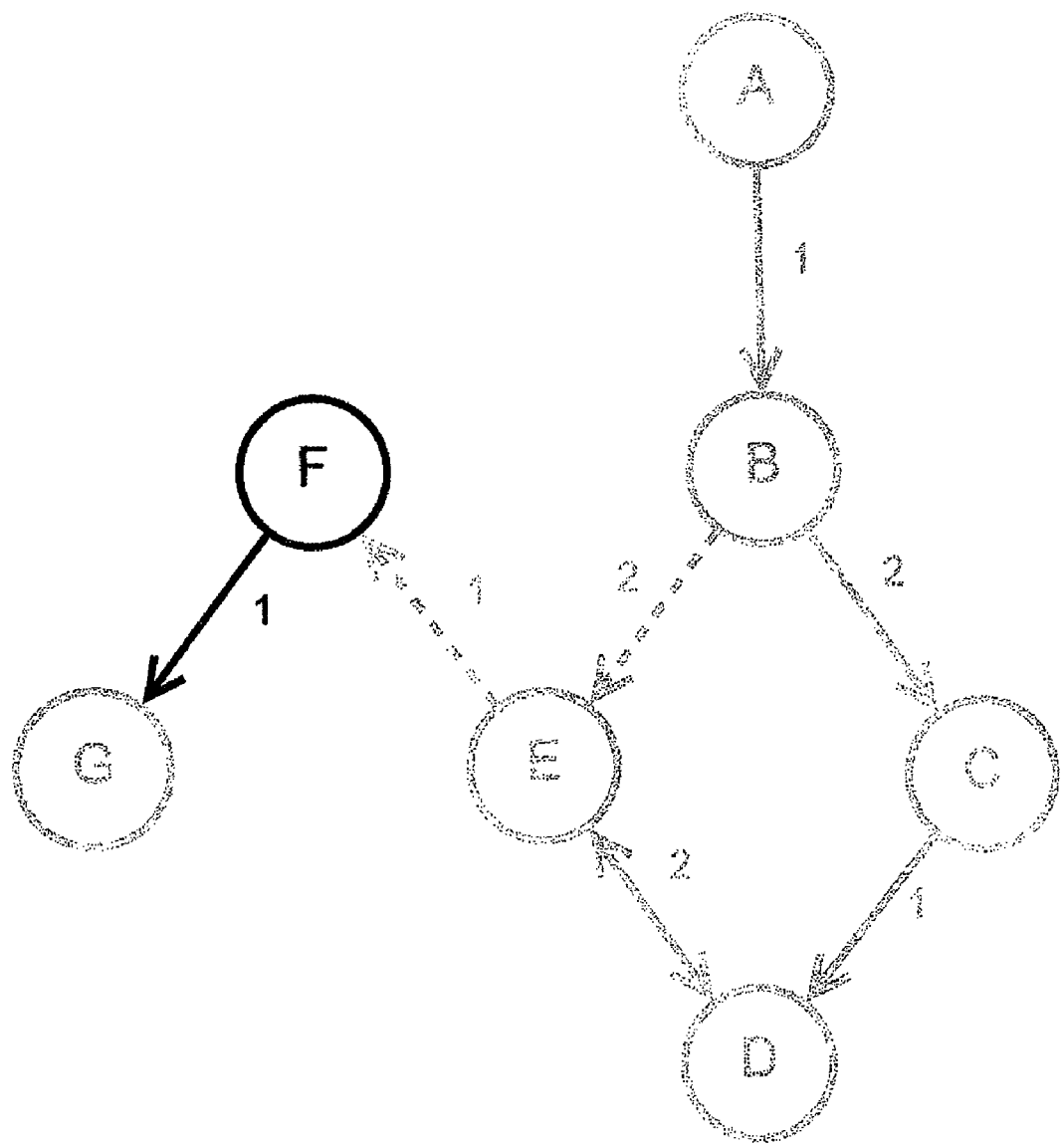
FIG. 20 illustrates an iteration of an embodiment as applied to the appearance of E, now in the first universe following the combining of universes after the finding of the target intersect F for which the additional universes were created, according to an embodiment.

Referring now to FIG. 20, illustrated is an iteration of an embodiment as applied to the appearance of F in universe five. Because F is a target for a number of universes, those universes no longer have a need to exist, and collapse back into universe one.

Figure 21:
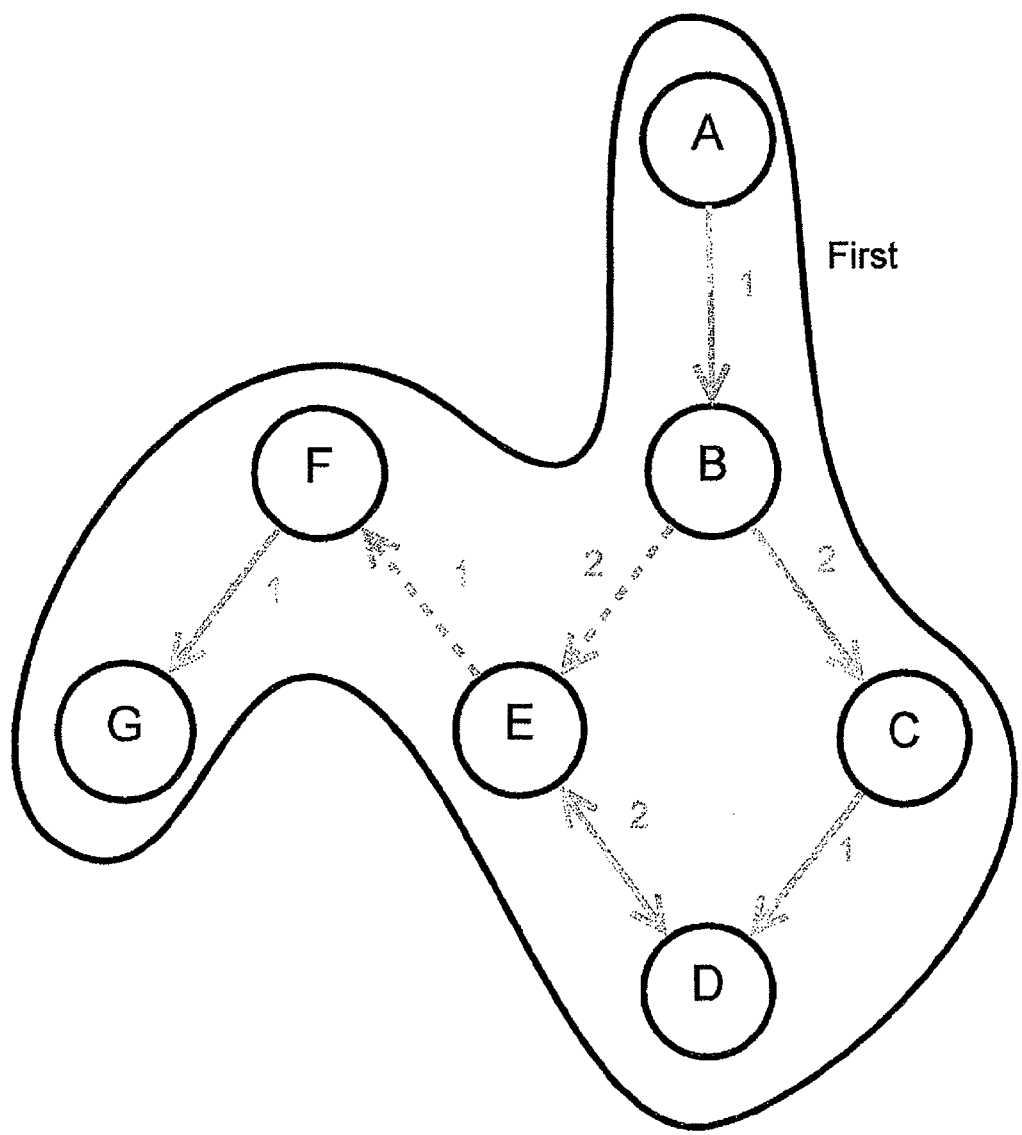
FIG. 21 illustrates the combining of additional universes into universe one following the finding of a target, according to an embodiment.

Referring now to FIG. 21, the collapse of the multiple universes back into universe one is illustrated.

Figure 22:
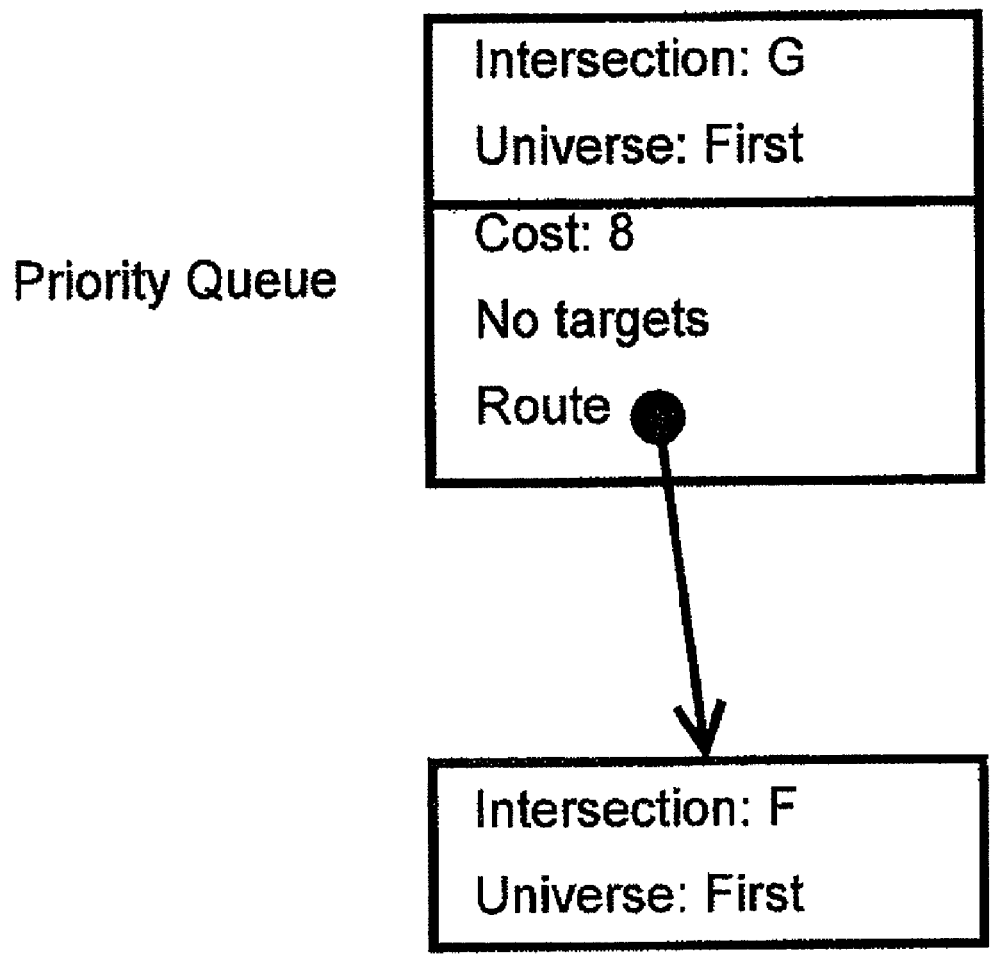
FIG. 22 illustrates the data structure at the end of the process, according to an embodiment.

Referring now to FIG. 22, the priority queue data structure contains intersection G, the target intersection. Following the successive route links back through the data structure will yield the correct route A→B→C→D→E→F→G in reverse order.

A further embodiment is computer readable code or program instructions on one or more computer readable mediums capable of carrying out processes discussed above. A computer readable medium is any data storage device that is capable of storing data, or capable of permitting stored data to be read by a computer system. Examples include hard disk drives (HDDs), flash memory cards, such as CF cards, SD cards, MS cards, and xD cards, network attached storage (NAS), read-only memory (ROM), random-access memory (RAM), CD-ROMs, CD-Rs, CD-RWs, DVDs, DVD-Rs, DVD-RWs, holographic storage mediums, magnetic tapes and other optical and non-optical data storage devices. The computer readable medium can also be in distributed fashion over multiple computer systems or devices which are coupled or otherwise networked together and capable of presenting a single view to a user of the medium.

A further embodiment is a computer system or similar device configured to access computer readable code or program instructions from a computer readable medium and to execute program instructions using one or more CPUs to carry out embodiments as described. Such computer system can be, but is not limited to, a typical personal computer, microcomputers, a handheld device such as a cell phone, PDA, BlackBerry, personal gaming machine, a personal or in-dash navigation system, a GPS enabled device, a network router, or a more advanced system such as a computer cluster, distributed computer system, server accessed over wired or wireless devices, a mainframe, or a supercomputer. In some embodiments, upon general completion of processes as discussed above, the computer system's computer readable medium contains a sequence of information objects where each information object represents a node, and the entire sequence of information objects represents the sequence of nodes which make up the shortest path through the network. In other embodiments, during a step of a process discussed above, content in the data structure is stored in the computer readable medium. In another embodiment, content removed from the data structure is deleted from the computer readable medium.

In some embodiments, the sequence of information objects is transmitted via a data-transmission network, such as an Ethernet, Bluetooth or infra-red network to a second computer system. In other embodiments, some or all of the content stored in the computer readable medium is transmitted via a similar network.

In other embodiments, the computer system generates signals or instructions based on the results of the program instructions and/or the contents of the computer readable medium. For instance, according to some embodiments, the computer system reads the sequence of information objects and uses the sequence to generate signals or instructions. In some embodiments, the signals or instructions are perceptible by a user of the computer system. For example, the computer system can generate visual instructions or signals based on the results of the program instructions, thereby permitting a user of the computer system to follow an optimal route to a destination. For example, a computer system according to one embodiment generates one or more images on an LCD, a heads-up display, on paper via a printer, or by using a similar display device to instruct a user of the system which way to travel. Such instructions, for example, may comprise a street map with visual aids directing a user to travel down specific streets, or may comprise written directions from the driver's origination or current location. In some embodiments, the visual aids are arrows or similar colored lines overlaid over a street map. In some embodiments, the driver's progress is displayed on the screen, and the visual aids or directions update as the driver moves. In some embodiments, the images simulate motion, such as a vehicle traveling down a city street. In some embodiments, the screen is interactive. For example, in some embodiments the user can input his current and destination locations, update costs for given streets or routes, or change his destination en route.

In other embodiments, the computer system generates audible instructions or signals, thereby permitting a user of the computer system to follow an optimal route to a destination. Such signals may comprise, for example, beeps or tones that are generated when a driver approaches a pertinent intersection, or may comprise verbal directions, such as "turn left ahead." In some embodiments, the verbal directions are in a language the user understands, such as English or French, and the language can be changed by the user of the system based on their personal preferences.

In some embodiments, the computer system is integrated into an automobile navigation system or similar system. For example, in some embodiments, the visual outputs of the computer system are output via the car's in-dash video display, and/or the audio outputs of the computer system are output via the car's audio speakers. In other embodiments, a vehicle or similar device is controlled directly by the computer system. For example, the computer system generates control instructions and transmits those control instructions directly to a vehicle's engine, steering, braking, and other components to control these components and to maintain the vehicle on the required path. In other embodiments, the computer system generates control instructions to control the direction and motion of robots, machines with propulsion and steering components such as engines and actuators, or similar machines to maintain the robots or similar machines on a specified path. For instance, the computer system sends signals to a robot's actuators or motors. Based on these signals, the motors or actuators are activated or deactivated. The robot's motion can thereby be controlled in any manner desired. The computer system controls the robot's motion to maintain the robot on a desired path.

In some embodiments, the computer system routes data packets to destination computers or routers using variations of the processes discussed above. For example, a router incorporating embodiments can minimize data transmission time to a destination computer by determining the optimal path to route incoming data packets and routing the incoming data packets accordingly.

In some embodiments, the computer system is used to route packages or similar objects to a specified location in an optimal manner. For instance, to route a package from New York, USA to Tokyo, Japan in the fastest manner. At destinations along the trip, such as a shipper's routing hub or sorting facility, the computer system generates signals to route the package onto the optimal transport, such as a non-stop flight or an overnight freighter to maintain the package on the shortest path, in this case based on transit time, to its destination In some embodiments, multiple systems utilizing the processes described above work in unison to achieve a general result. For instance, multiple vehicles operating according to an embodiment can communicate with each other in real time to update travel costs and coordinate optimal paths for each of the vehicles uniquely. In another embodiment, each vehicle is given a route that minimizes the total travel time for the group of vehicles as a whole, though not necessarily each vehicle individually. In another embodiment, a collection of routers operate in a similar manner, and update each other with data bottlenecks and other problems in real time. For example, in one embodiment a collection of routers is configured to route data packets to a destination in the most efficient manner.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein.

What is claimed is:

1. A computer-implemented method for determining an overall driving route for a vehicle traveling between a starting location of the vehicle and a destination location of the vehicle in a geographical area, the geographical area comprising a plurality of geographical locations and a plurality of geographical roadways, wherein each geographical roadway connects two geographical locations in the geographical area and has at least one cost value for the vehicle to travel along the geographical roadway, the computer-implemented method comprising:

accessing, using a computer system, a model from a computer accessible storage repository, the model representing the geographical area in which the vehicle is traveling, the model comprising a plurality of nodes representing the geographical locations in the geographical area, and a plurality of edges representing the geographical roadways of the geographical area, wherein a selected edge connects a first one of the plurality of nodes and a second one of the plurality of nodes in the model of the geographical area, wherein the selected edge is assigned a first cost value representing a first cost for the vehicle to travel along the geographical roadway;

accessing, using the computer system, the starting location of the vehicle and the destination location where the vehicle is to travel;

determining, using the computer system, whether the selected edge is part of a multi-edge constraint;

in response to determining that the selected edge is part of a multi-edge constraint, subdividing, using the computer system, the model into two or more universes, wherein a universe comprises one or more of the plurality of nodes, wherein the universes are configured to be merged or discarded when a node at an end of the multi-edge constraint is found;

assigning at least one of the universes to each of the nodes encountered, wherein a first universe is assigned to the starting location, and wherein a second universe other than the first universe is assigned to a second node when the second node is a start or continuation of the multi-edge constraint, or when the second node is a neighbor of the start of the multi-edge constraint;

assigning, using the computer system, a second cost value to the selected edge based on which universes the first node and the second node connected by the selected edge are in;

determining, using the computer system, universe driving routes for the two or more universes, wherein the universe driving routes each comprise a first ordered set of the plurality of edges, wherein the second cost assigned to the selected edge depends at least in part on which of the universes the first node and second node connected by the selected edge are located in;

determining, using the computer system, one or more geographical area driving routes for the vehicle traveling between the starting location of the vehicle and the destination location where the vehicle is to travel, wherein the one or more geographical area driving routes comprise a second ordered set of the plurality of edges, wherein the selected edge connects one or more of the universe driving routes associated with the first node to one or more of the universe driving routes associated with the second node;

calculating, using the computer system, a total cost value for each of the one or more geographical area driving routes, wherein the total cost value is a summation of cost values for the ordered set of the plurality of edges used for the one or more geographical area driving routes; and selecting, using the computer system, a selected geographical area driving route from the one or more geographical area driving routes with the lowest calculated total cost value, wherein the computer system comprises at least a processor and a storage device;

thereby enabling determination of the overall driving route for the vehicle traveling between the starting location and the destination location in a geographical area with multi-edge constraints.

2. The computer-implemented method of claim 1, wherein the computer system comprises one or more computer systems connected via a network connection.

3. The computer-implemented method of claim 1, wherein the first cost value assigned to the selected edge in the model represents at least one of a time cost for the vehicle to travel along the geographical roadway represented by the selected edge, a monetary cost for the vehicle to travel along the geographical roadway represented by the selected edge, and a distance for the vehicle to travel along the geographical roadway represented by the selected edge.

4. The computer-implemented method of claim 1, wherein the starting location represents a current location of the vehicle and the destination location represents a desired destination.

5. The computer-implemented method of claim 1, wherein the multi-edge constraint represents at least one of a no u-turn restriction, a no-left turn restriction, or a no-right turn restriction in a one of the geographical roadways.

6. The computer-implemented method of claim 1, further comprising generating direction data, using the computer system, to facilitate following the selected driving route to the destination location.

7. The computer-implemented method of claim 6, further comprising transmitting over a network the generated direction data to a second computer system in the vehicle.

8. The computer-implemented method of claim 7, further comprising causing the second computer system to generate a human perceivable message based on the generated direction data received over the network.

9. The computer-implemented method of claim 8, wherein the human perceivable message is a visual output.

10. The computer-implemented method of claim 1, further comprising communicating, using the computer system, with the vehicle and one or more additional vehicles to obtain updated cost values to revise the selected geographical area driving route.

11. The computer-implemented method of claim 1, wherein the selecting the geographical area driving route with the lowest calculated total cost value comprises selecting the geographical area driving route for the vehicle that minimizes a total travel time for a group of vehicles as a whole, wherein the group of vehicles includes the vehicle and at least one or more additional vehicles.

12. The computer-implemented method of claim 1, further comprising transmitting the selected driving route to a mobile device in the vehicle.

13. The computer-implemented method of claim 1, wherein the selecting the driving route further comprises selecting a unique driving route for a plurality of vehicles.

14. The computer-implemented method of claim 13, wherein the cost value is travel time, and wherein the selected geographical area driving route for each of the plurality of vehicles minimizes a total travel time for the plurality of vehicles as a whole while not necessarily minimizing the travel time of an individual vehicle.

15. The computer-implemented method of claim 1, wherein the first cost value assigned to the selected edge is generated based on data received from a plurality of vehicles traveling in the geographical area.

16. The computer-implemented method of claim 1, wherein the starting location of the vehicle is determined by a global positioning device.

* * * * *

UNITED STATES PATENT AND TRADEMARK OFFICE
CERTIFICATE OF CORRECTION

PATENT NO. : 8,214,142 B2
APPLICATION NO. : 13/245610
DATED : July 3, 2012
INVENTOR(S) : Cerecke et al.

It is certified that error appears in the above-identified patent and that said Letters Patent is hereby corrected as shown below:

In column 8 at line 44, Change "4" to --which is 4--.

In column 11 at line 57-58, Change "destination" to --destination.--.

In column 13 at line 44, In Claim 5, change "a one" to --one--.

Signed and Sealed this
Twenty-seventh Day of November, 2012

David J. Kappos
*Director of the United States Patent and Trademark Office*